US009230373B2

(12) United States Patent
Dziadosz et al.

(10) Patent No.: US 9,230,373 B2
(45) Date of Patent: Jan. 5, 2016

(54) SYSTEM AND METHOD TO AGGREGATE CONTROL OF MULTIPLE DEVICES VIA MULTICAST MESSAGES AND AUTOMATIC SET UP OF CONNECTIONS

(71) Applicant: Honeywell International Inc., Morristown, NJ (US)

(72) Inventors: John A. Dziadosz, Burlington, WI (US); Shiyuan Qi, New Berlin, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 384 days.

(21) Appl. No.: 13/761,871

(22) Filed: Feb. 7, 2013

(65) Prior Publication Data

US 2014/0218514 A1    Aug. 7, 2014

(51) Int. Cl.
G08B 21/00    (2006.01)
G07C 9/00    (2006.01)
H04L 29/08    (2006.01)
H04L 29/06    (2006.01)

(52) U.S. Cl.
CPC ........ *G07C 9/00007* (2013.01); *H04L 63/0428* (2013.01); *H04L 63/104* (2013.01); *H04L 63/168* (2013.01); *H04L 67/16* (2013.01); *H04L 67/12* (2013.01)

(58) Field of Classification Search
CPC ............ G07C 9/00007; H04L 63/0428; H04L 63/104; H04L 63/168
USPC .......................................... 340/5.2; 348/143
See application file for complete search history.

(56) References Cited

U.S. PATENT DOCUMENTS

| | | | |
|---|---|---|---|
| 5,909,183 A * | 6/1999 | Borgstahl et al. .......... | 340/12.29 |
| 2002/0035681 A1 * | 3/2002 | Maturana et al. ............. | 713/151 |
| 2003/0018891 A1 * | 1/2003 | Hall et al. ...................... | 713/160 |
| 2005/0242921 A1 * | 11/2005 | Zimmerman et al. ......... | 340/5.2 |
| 2009/0024853 A1 * | 1/2009 | Yeap et al. .................... | 713/182 |
| 2013/0091210 A1 * | 4/2013 | Rajakarunanayake et al. ............................ | 709/204 |

* cited by examiner

Primary Examiner — Mark Rushing
(74) Attorney, Agent, or Firm — Husch Blackwell LLP

(57) ABSTRACT

A method and apparatus are provided wherein the method includes the steps of a downstream controller of a security system advertising a service type of the downstream controller on a sub-network, a gateway controller of the security system detecting the advertisement and authenticating the downstream controller as being part of a group that also includes the gateway controller, the gateway controller sending a connection request to the downstream controller, the gateway and downstream controllers establishing an L4 connection based upon the connection request, and the gateway and downstream controllers establishing a L5 session channel through the L4 connection.

20 Claims, 2 Drawing Sheets

SYSTEM AND METHOD TO AGGREGATE CONTROL OF MULTIPLE DEVICES VIA MULTICAST MESSAGES AND AUTOMATIC SET UP OF CONNECTIONS

FIELD

The field of the invention relates to security systems and more particularly to the control of security devices in security systems.

BACKGROUND

Security systems are generally known. Such systems are typically used to protect secured areas from threats. Threats may include intruders that represent a threat to authorized persons within the secured area or environmental threats, such as fire or smoke.

Access to the secured areas is usually prevented via the use of a fence of walls that surround the secured area. One or more doors may be provided for access by authorized persons.

A centrally located control panel may be provided that monitors the secured area. One or more sensors and/or cameras may detect intruders or environmental threats within the secured area. The sensors may include limit switches on the doors to detect intruders entering the secured area. Card readers may be provided on the doors to detect entry by authorized persons.

While such systems work well, they are often difficult to set up and administer. In the case of large installations, the number of doors and sensors may number in the hundreds. Because of the large number of doors and sensors, such systems are difficult to configure. Accordingly, a need exits for expedited ways of setting up such security systems.

DETAILED DESCRIPTION OF AN ILLUSTRATED EMBODIMENT

Figure 1:
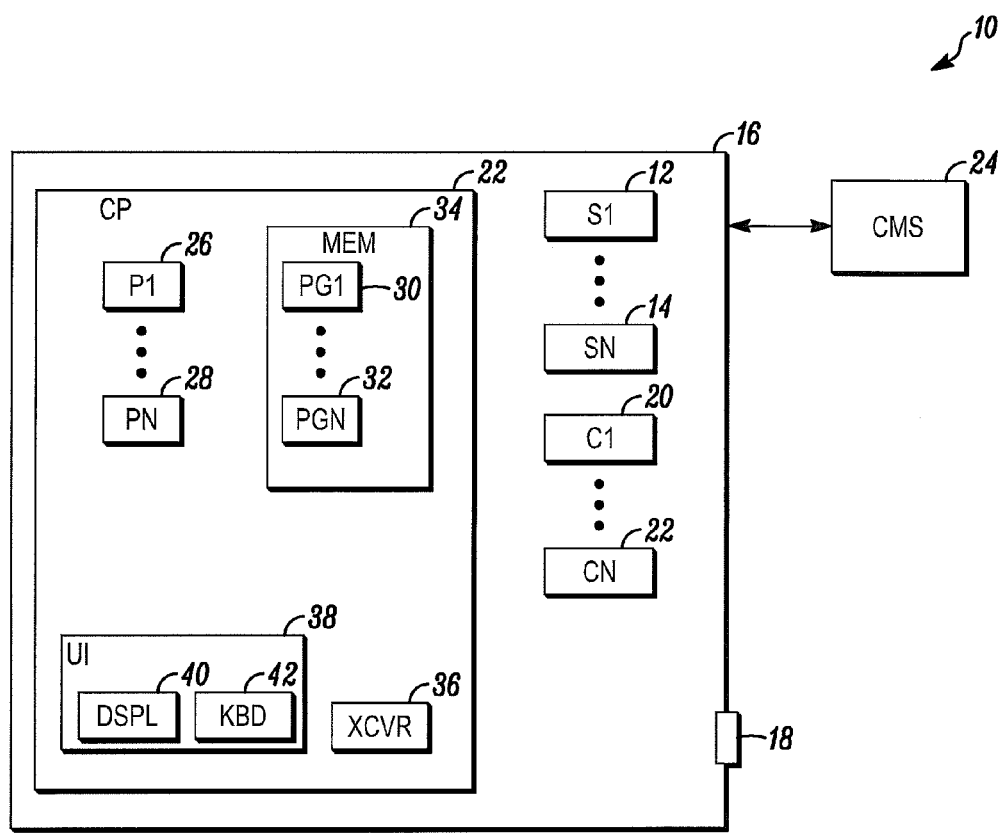
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the security system may be one or more sensors 12, 14 that detect threats within a secured area 16. The threats may be due to the presence of intruders or due to environmental threats. In the case of intruders, the sensors may include limit switches connected to portals (e.g., doors, windows, etc.) 18 that provide entry into or egress from the secured area 16. Alternatively, the one or more of the sensors may include a card reader and electrically activated lock that provides access to authorized users of the area 16 through one of the doors 18.

In the case of environmental threats, one or more of the sensors may be constructed to detect fires. Other sensors may be constructed to detect natural gas.

Also included within the secured area may be one or more cameras 20, 22. The cameras may be monitored by a security guard or may include a motion detection capability.

The sensors and cameras may each be monitored via a control panel 22. Upon detection of a threat via one of the sensors or cameras, the control panel may send an alarm message to a central monitoring station 24. The central monitoring station may respond by sending help (e.g., the police, fire department, etc.).

Included within the control panel (and each of the sensors and cameras) may be one or more processor apparatus (processors) 26, 28 operating under control of one or more computer programs 30, 32 loaded from a non-transitory computer readable medium (memory) 34. As used herein, reference to a step performed by a computer program of the panel is also a reference to the processor that executed that step.

In this regard, an alarm processor of the panel may monitor the sensors and cameras. Upon detecting a security threat, the processor may activate a local audio/visual alarm. The processor may also compose and send an alarm message to the central monitoring station. The message may include an identifier of the security system (e.g., account number, address of the secured area, etc.) and an identifier of the type and location of the sensor or camera.

The panel and each of the sensors may be joined via a wired or wireless connection. Where a wireless connection is used, the panel and each of the sensors may also include a wireless transceiver 36. The wireless transceivers 36 may be used to set up a wireless connection channel between the control panel and each of the sensors and with the cameras.

Under one illustrated embodiment, the connection between the panel and each of the sensors and cameras may use a Zero Configuration/Multicast DNS type protocol as described by the IETF Zero Configuration Working Group (e.g., www.zeroconf.org). The use of the Zero Configuration/Multicast DNS messaging allows a respective corresponding connection to be automatically set up between the panel and each of the sensors and cameras with very little or no human involvement.

In order to facilitate set up of the connection between the panel and each of the sensors and cameras, one or more gateways within the panel may exchange a series of messages with one or more downstream processors within (or associated with) each of the sensors and cameras. The gateway within the panel refers to one or more programmed processors 26, 28 and a transceiver 36 operating together as the gateway. Similarly, the term "downstream processor" is used herein to generically refer to a respective portion of one of the sensors or cameras, where the portion referred to includes one or more programmed processors 26, 28 and a transceiver 36 within the respective sensor or processor.

In this regard, the gateway may be provided with one or more lists of service groups. As used herein, a service group refers to one or more sensors and/or cameras that provide the same or a similar functionality. For example, a sensor may be an access controller (including a card reader, an electrically operated lock, associated processors and transceiver) that that is included within one particular type of service group. Similarly, a camera may include a motion detector (including a camera, motion detection processor and transceiver) that is included within another service group. As a still further alternative, a sensor could include a window or door opening sensor module (including a limit switch, processor and transceiver) that is included within still another service group.

For each service group, the gateway may transmit a multicast message identifying one service group at a time to the sensors and cameras in order to automatically discover the respective members of each service group. The multicast message transmitted by the gateway includes at least an identifier of the service group and an authentication certificate.

The downstream controllers only respond to the multicast message identifying the service group of which the controller is a member. In this regard, any downstream controller that receives the message responds with an advertisement message advertising the type of service provided by that sensor or camera. The gateway authenticates the downstream controller and sets up a channel with the downstream controller.

As each downstream controller is discovered, identifying characteristics of the downstream controller are saved in a system map table and a service status table. In the case where the gateway connects with different types of service groups, the identifying characteristics of each group may be saved in a different table associated with that group.

However, occasionally, the connection with the downstream controller may be periodically lost. In order to accommodate this possibility, the gateway controller periodically re-enters the discovery mode (e.g., every 30 seconds) to rediscover each of the sensors and/or cameras within the secured area that is within range. The gateway may then browse the responses to update the system map table.

Figure 2:
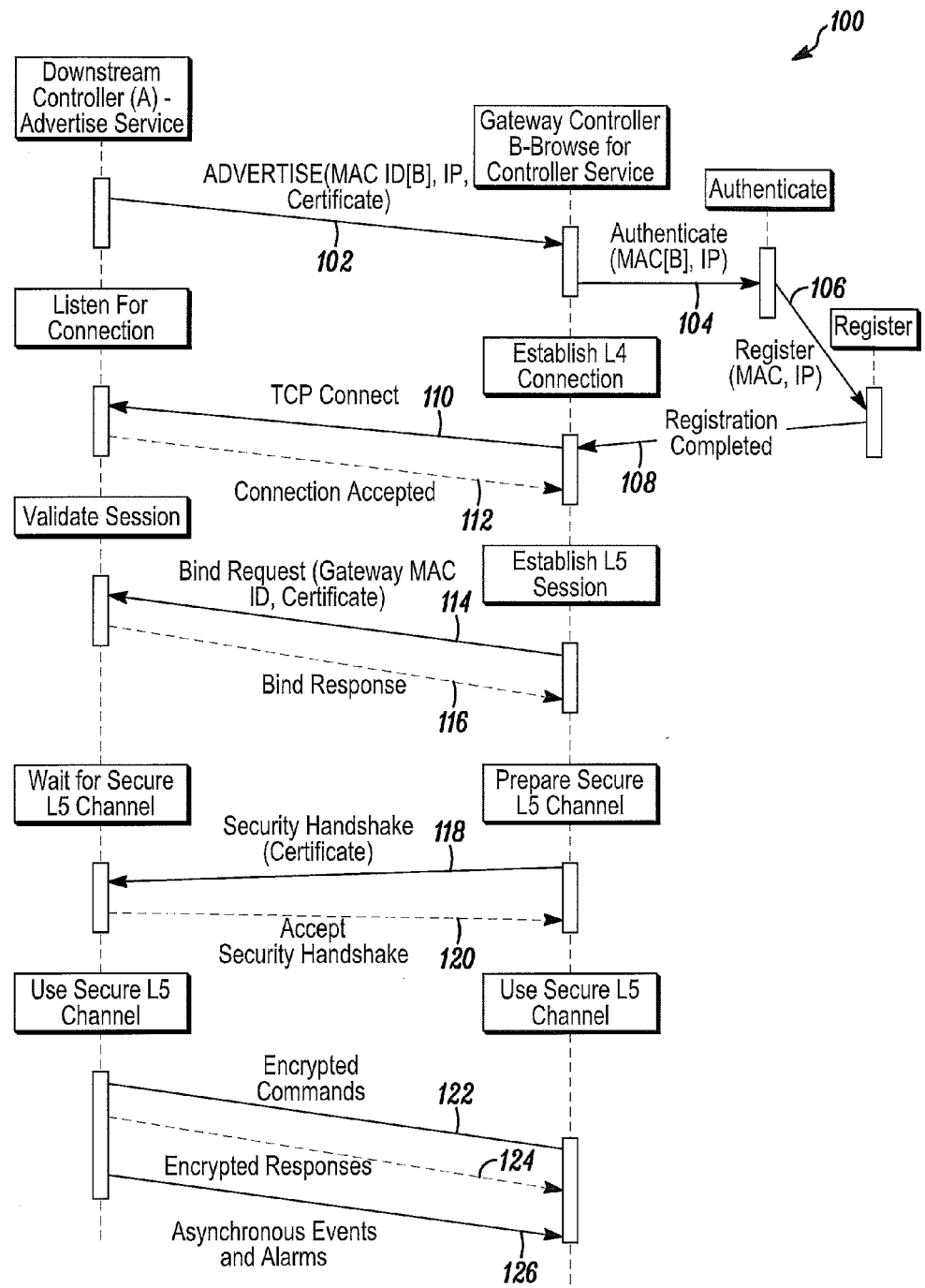
FIG. 2 is a block diagram of a set of steps that may be implemented by the system of FIG. 1.

FIG. 2 depicts a simplified flow chart 100 of registration of the sensors and cameras with the system 10 through the gateway. In this regard, the downstream controller transmits 102 an advertisement message in response to the unicast discovery message from the gateway. The advertisement message 102 may include a MAC address of the downstream controller, the IP address and a signed certificate. In this case, the certificate may have been signed by the downstream controller in order to authenticate the downstream controller with the gateway controller.

The advertisement message may also include one or more additional data fields. Included within the additional data fields may be an identifier of the service provided through the downstream controller (e.g., an identifier of the downstream controller as being an access controller, a camera, etc.). The data fields may also include other identifiers including a revision number of the software operating on the downstream controller, a card reader model, camera model, etc.

The gateway receives the advertisement message and authenticates 104 the downstream controller. The gateway may authenticate the downstream controller based upon the prior knowledge of the certificate processing and signing capabilities used by the downstream controller in signing the authentication certificate that was originally provided by the gateway.

Once the downstream controller has been authenticated, the downstream controller may be registered 106 by a registration processor into the system map table and status table. In addition to registering the downstream controller into the system map, the gateway controller may also register the downstream controller with an appropriate set of alarm processing applications. For example, a downstream controller that includes a camera may be registered with one or more recording applications that record video from the camera, either continuously, or only when motion is detected within a field of view of the camera.

The registration processor may also forward a registration complete message to an appropriate processor of the gateway controller. In response, the gateway controller may take steps to set up a layer 4 (L4) connection with the authenticated downstream controller. In this regard, the gateway processor may send 110 a TCP connect message to the downstream controller. The downstream controller may respond 112 with a connection accepted message.

The gateway may also take steps to set up a communication channel between the authenticated downstream controller and the gateway via a layer 5 (L5) session. This gateway may do this by sending 114 a bind request to the downstream controller. The bind request may include the MAC address of the gateway and a security certificate. The downstream controller may reject the bind request if the controller is already bound to another gateway. If not, the downstream controller may complete channel set up by returning 116 a bind response to the gateway.

The downstream controller may also save data regarding the connection in a gateway status file of memory of the downstream controller. The data may include at least an identifier of the gateway and an IP address of the gateway. The data of the connecting gateway is saved in memory of the downstream controller in case another gateway queries the downstream controller. If so, then the downstream controller rejects the connection from the other gateway.

The gateway may also establish a secure connection with the downstream controller via a layer 5 (L5) session. In this regard, the gateway may send 118 a security handshake including a security key and encryption method (e.g., AES). Where AES is used, encryption may be performed via SSL/TLS.

The downstream controller may return 120 an accept security handshake including an acknowledgement of a security level and method and level of encryption. The details of the secure connection may also be saved in the connection file.

Once a secure channel has been set up between the gateway and downstream controller, messages may be exchange as needed. In this regard, encrypted commands may be sent 122 from the gateway to the downstream controller and encrypted responses may be received 124.

Asynchronous messages may also be sent and received. For example, in the case where the downstream controller is a door switch, activation of that switch may result in an alarm message being sent 126 to the gateway.

Once a channel has been set up with each downstream controller, a user may access the corresponding sensors and cameras via a user interface 38. Within a display 40 of the user interface, one or more gateways may be displayed. The user may click on the gateway using a mouse or keyboard 42 to see a list of discovered sensors and cameras by service group. The user may click on each service group and receive a list of devices (e.g., sensors, cameras, etc.) discovered within that service group by the gateway.

Upon clicking on one of the devices, a set up processor of the panel operating through the gateway may retrieve the settings of that device. If the device is a camera, the settings may include a frame rate of the camera, whether the camera has motion detection capability and whether the camera has a pan-tilt-zoom (PTZ) capability. The user may adjust the settings and assign a PTZ processor to the camera in order to control the PTZ capability of the camera.

Similarly, if the device is an access controller, the user may view the model of the card reader and adjust its capabilities. The user may also download a set of identifiers of authorized users or logically connect the card reader to a separate authorization processor.

Upon completion of set up, the system may operate conventionally. Activation of a sensor by an intruder may cause a message to be sent through the established channel to the alarm processor of the panel. The panel may activate a local alarm and send an alarm message to the central monitoring station 24.

The use of the gateway allows a number of wired and/or wireless downstream controllers (i.e., sensors and/or cameras) to be aggregated through a single gateway. In addition, should one gateway become disabled, the sensors and cameras may be automatically discovered and the connections re-established through another gateway.

In one example, gateways periodically (e.g., every 30 seconds) re-discover the downstream controllers of the service group(s) assigned to that gateway. For each device that responds, the gateway attempts to find the MAC address of that downstream controller in its service status table. If the gateway cannot find the MAC address, this downstream controller is a new device and will be added to the service status table. If the MAC adder is found, the gateway will compare the downstream controller's IP address and identifier (host name) with the current content of the record in the service status table. If the IP address and/or host name has been changed, then the entry is updated.

In this regard, the availability of multiple gateways allows each gateway to create a distinct grouping of downstream controllers. With multiple gateways, each gateway may serve as a backup for one or more other controllers.

Under some embodiments, authentication of downstream controllers could be a manual process that involves participation by an administrator. This could be useful where a sensor or camera of each discovered downstream controller is manually activated by the administrator to confirm the location of the discovered controller.

Under other embodiments, authentication of gateway controllers by downstream controllers may optionally involve a third-party or other trusted party that validates the authenticity of the gateway certificate. This may be accomplished by connecting an optional processor to each of the downstream processors where the optional processors may include additional capabilities to process and authenticate certificates.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
a downstream controller of a security system advertising a service type of the downstream controller on a sub-network, the service type identifying at least a type of threat within a secured area of the security system due to fire;
a gateway controller of the security system detecting the advertisement and authenticating the downstream controller as being part of a group that also includes the gateway controller;
the gateway controller sending a connection request to the downstream controller;
the gateway and downstream controllers establishing an L4 connection based upon the connection request; and
the gateway and downstream controllers establishing an L5 session channel through the L4 connection.

2. The method as in claim 1 wherein the downstream controller further comprises a card reader granting access into a secured area of the security system.

3. The method as in claim 2 wherein the advertisement for the service type further comprises including a service type identifier of a card reader controller in the advertisement.

4. The method as in claim 1 wherein the downstream controller further comprises a camera capturing images of the secured area.

5. The method as in claim 4 wherein the advertisement for the service type further comprises including a service type identifier of the camera in the advertisement.

6. The method as in claim 1 further comprising the gateway controller multicasting an identifier of a service group of the downstream controller and the downstream controller advertising for the service type in response to the multicast.

7. The method as in claim 1 further comprising establishing an encrypted channel during the L5 session.

8. The method as in claim 1 further comprising the downstream controller and gateway controller establishing a Zero configuration, Multicast DNS connection as defined by the Zero Configuration Working Group.

9. An apparatus comprising:
a downstream controller of a security system that advertises a service type of the downstream controller on a sub-network, the service type identifying at least a type of threat within a secured area of the security system due to fire; and
a gateway controller of the security system that detects the advertisement and authenticates the downstream controller as being part of a group that also includes the gateway controller,
wherein the gateway controller sends a connection request to the downstream controller,
wherein the gateway and downstream controllers establish an L4 connection based upon the connection request, and
wherein the gateway and downstream controllers establish an L5 session channel through the L4 connection.

10. The apparatus as in claim 9 wherein the downstream controller further comprises an access controller.

11. The apparatus as in claim 10 wherein the access controller further comprises a card reader that grants access into a secured area of the security system.

12. The apparatus as in claim 9 wherein the advertisement for the service type further comprises a service type identifier of a card reader controller in the advertisement.

13. The method as in claim 9 wherein the downstream controller further comprises a camera that captures images of the secured area.

14. The apparatus as in claim 13 wherein the advertisement for the service type further comprise a service type identifier of the camera in the advertisement.

15. The apparatus as in claim 9 further comprising a processor of the gateway controller that multicasts an identifier of a service group of the downstream controller, wherein the downstream controller advertises for the service type in response to the multicast.

16. An apparatus comprising:
a security system that protects a secured area;
a sub-network of the security system;
a downstream controller of the security system that advertises a service type of the downstream controller on the sub-network, the service type identifying at least a type of threat within the secured area due to fire; and
a gateway controller of the security system that detects the advertisement and authenticates the downstream controller as being part of a group that also includes the gateway controller,
wherein the gateway controller sends a connection request to the downstream controller,
wherein the gateway and downstream controllers establish an L4 connection based upon the connection request, and
wherein the gateway and downstream controllers establish an L5 session channel through the L4 connection.

17. The apparatus as in claim 16 wherein the downstream controller further comprises one of a sensor or a camera.

18. The apparatus as in claim 16 further comprising a processor that establishes an encrypted channel between the gateway controller and downstream controller.

19. The apparatus as in claim 16 further comprising a plurality of gateway controllers.

20. The apparatus as in claim 16 further comprising a processor of the gateway controller that periodically re-discovers the downstream controller.

\* \* \* \* \*